(12) United States Patent
Ruppel et al.

(10) Patent No.: US 10,398,071 B2
(45) Date of Patent: Sep. 3, 2019

(54) DRUM STYLE ROTARY TILLER

(71) Applicant: Ardisam, Inc., Cumberland, WI (US)

(72) Inventors: Mark G. Ruppel, Cumberland, WI (US); Randy L. Schamberger, Cumberland, WI (US); David P. Flesch, Cumberland, WI (US); Robert J. Ruppel, Cumberland, WI (US)

(73) Assignee: Ardisam, Inc., Cumberland, WI (US)

( * ) Notice: Subject to any disclaimer, the term of this patent is extended or adjusted under 35 U.S.C. 154(b) by 0 days.

(21) Appl. No.: 15/669,351

(22) Filed: Aug. 4, 2017

(65) Prior Publication Data

US 2018/0124990 A1 May 10, 2018

Related U.S. Application Data

(63) Continuation of application No. 14/954,254, filed on Nov. 30, 2015, now Pat. No. 9,730,371, which is a continuation of application No. 13/826,968, filed on Mar. 14, 2013, now Pat. No. 9,307,687.

(51) Int. Cl.
*A01B 33/02* (2006.01)
*A01B 33/08* (2006.01)
*A01B 33/16* (2006.01)

(52) U.S. Cl.
CPC .......... *A01B 33/028* (2013.01); *A01B 33/021* (2013.01); *A01B 33/082* (2013.01); *A01B 33/16* (2013.01)

(58) Field of Classification Search
CPC .............................. A01B 33/00; A01B 33/028
USPC ......... 172/42, 108, 116, 122, 123, 125, 292, 172/329, 540, 554
See application file for complete search history.

(56) References Cited

U.S. PATENT DOCUMENTS

| | | | | | |
|---|---|---|---|---|---|
| 1,045,863 | A | * | 12/1912 | Lynch .................... | A01B 9/003 172/119 |
| 1,858,360 | A | * | 5/1932 | Cruse ..................... | E02F 3/188 172/122 |
| 1,944,789 | A | * | 1/1934 | Gravely ............... | B62D 51/004 172/125 |
| 2,888,994 | A | * | 6/1959 | Hoff ..................... | A01B 33/027 172/103 |
| 3,031,018 | A | * | 4/1962 | Smithers .............. | A01B 33/027 172/122 |
| 3,051,459 | A | * | 8/1962 | Witzenburg ........... | B65D 90/00 172/42 |
| 3,123,149 | A | * | 3/1964 | White .................. | A01B 33/028 172/125 |
| 4,276,940 | A | * | 7/1981 | Kirkegaard .......... | A01B 33/027 172/42 |

(Continued)

OTHER PUBLICATIONS

"U.S. Appl. No. 13/826,968, Final Office Action dated May 26, 2015", 8 pgs.

(Continued)

*Primary Examiner* — Gary S Hartmann
(74) *Attorney, Agent, or Firm* — Schwegman Lundberg & Woessner, P.A.

(57) ABSTRACT

A rotary tiller comprises a frame, a cylindrical drum rotatable relative to the frame, a plurality of tines extending from the cylindrical drum, a motor at least partially disposed within the cylindrical drum, wherein the motor is configured to rotate a motor output member, and a transmission at least partially disposed within the cylindrical drum and configured to engage the motor output member. The transmission is operable to drive rotational movement of the cylindrical drum.

10 Claims, 10 Drawing Sheets

(56) References Cited

U.S. PATENT DOCUMENTS

| | | | | |
|---|---|---|---|---|
| 7,303,025 B2* | 12/2007 | Mayer | ............... | A01B 45/026 |
| | | | | 172/123 |
| 8,210,272 B2* | 7/2012 | Notaras | ............ | A01B 33/028 |
| | | | | 172/42 |
| 9,307,687 B2* | 4/2016 | Ruppel | ............. | A01B 33/028 |
| 9,730,371 B2* | 8/2017 | Ruppel | ............. | A01B 33/028 |
| 2007/0163789 A1* | 7/2007 | Thackery | ......... | A01B 33/028 |
| | | | | 172/42 |
| 2011/0297404 A1* | 12/2011 | Welch | ............. | A01B 33/028 |
| | | | | 172/42 |
| 2014/0262369 A1 | 9/2014 | Ruppel et al. | | |
| 2016/0081256 A1 | 3/2016 | Ruppel et al. | | |

OTHER PUBLICATIONS

"U.S. Appl. No. 13/826,968, Non Final Office Action dated Sep. 16, 2014", 8 pgs.

"U.S. Appl. No. 13/826,968, Notice of Allowance dated Dec. 9, 2015", 5 pgs.

"U.S. Appl. No. 13/826,968, Response filed Mar. 13, 2015 to Non Final Office Action dated Sep. 16, 2014", 18 pgs.

"U.S. Appl. No. 13/826,968, Response filed Nov. 25, 2015 to Final Office Action dated May 26, 2015", 6 pgs.

"U.S. Appl. No. 14/954,254, Non Final Office Action dated Sep. 14, 2016'", 9 pgs.

"U.S. Appl. No. 14/954,254, Notice of Allowance dated Apr. 12, 2017", 5 pgs.

"U.S. Appl. No. 14/954,254, Response filed Mar. 13, 2017 to Non Final Office Action dated Sep. 14, 2016", 20 pgs.

"U.S. Appl. No. 14/954,254, Response filed Sep. 1, 2016 to Restriction Requirement dated Mar. 4, 2016", 8 pgs.

"U.S. Appl. No. 14/954,254, Restriction Requirement dated Mar. 4, 2016", 6 pgs.

"U.S. Appl. No. 14/954,254, Preliminary Amendment filed Feb. 18, 2016", 8 pgs.

\* cited by examiner

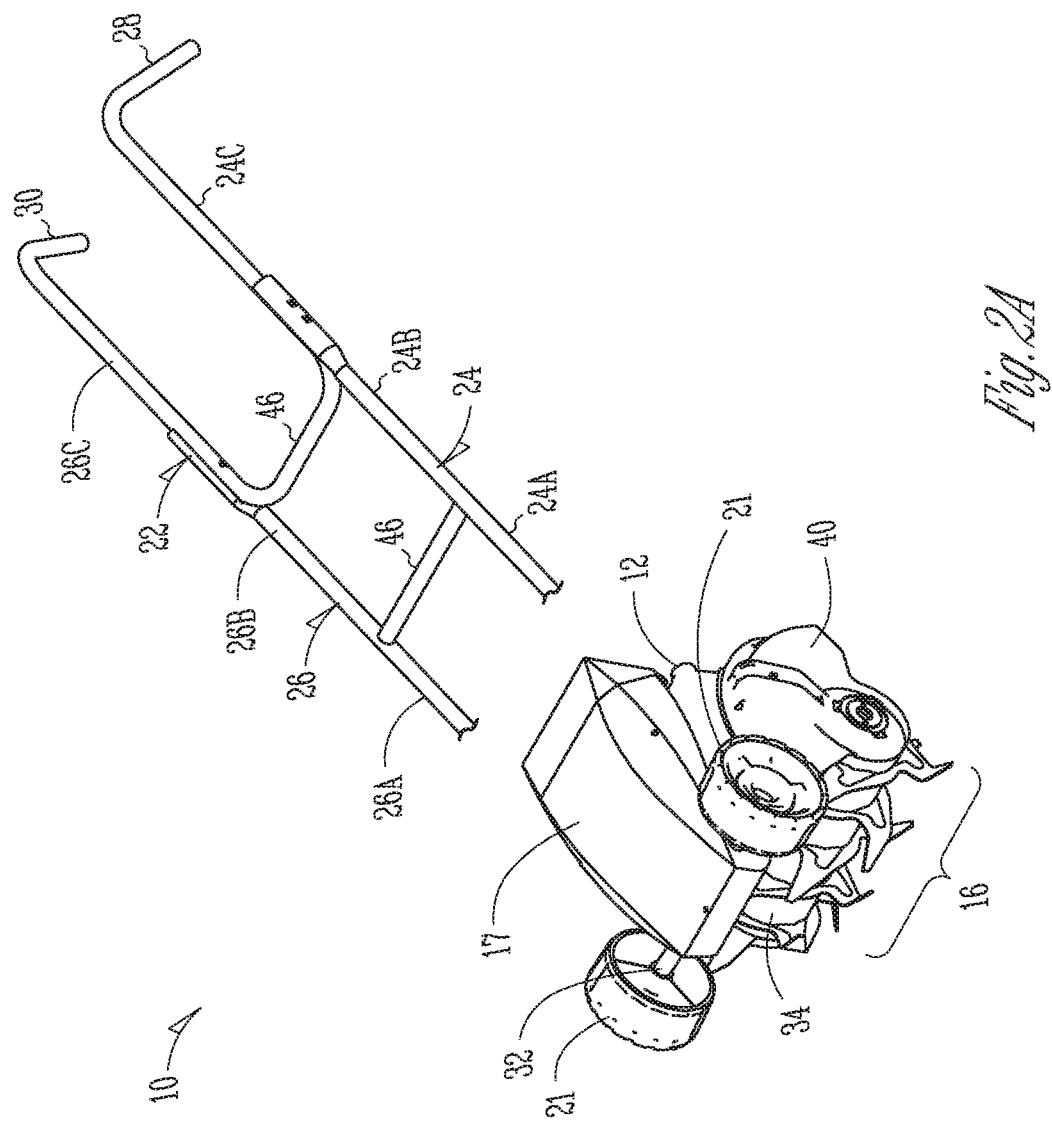

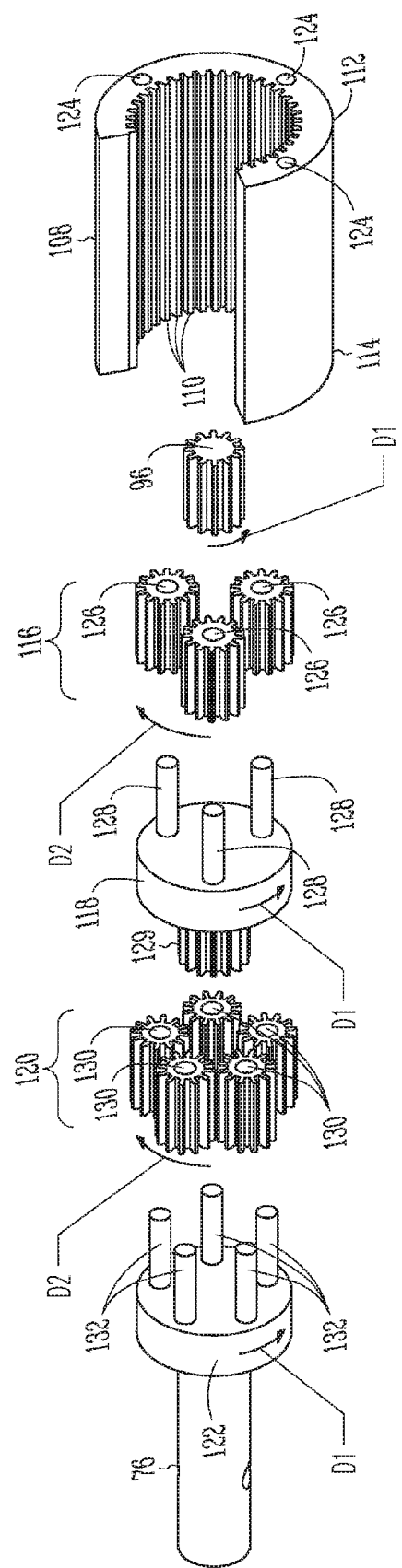

DRUM STYLE ROTARY TILLER

CLAIM OF PRIORITY

This application is a continuation of and claims the benefit of priority to U.S. application Ser. No. 14/954,254, filed Nov. 30, 2015, entitled "DRUM STYLE ROTARY TILLER," which is a continuation of and claims the benefit of priority to U.S. application Ser. No. 13/826,968, filed Mar. 14, 2013, entitled "DRUM STYLE ROTARY TILLER," which application is incorporated by reference as if reproduced herein and made a part hereof in its entirety, and the benefit of priority of which is claimed herein.

BACKGROUND

The present patent application relates to lawn and garden equipment, and, more particularly, to a rotary tiller having a transmission and drive system at least partially disposed within a cylindrical drum.

Several types of rotary tillers exist for performing various tilling operations in gardens, flowerbeds, lawns, or the like. Examples of these types include rear tine SRT ("standard rotating tine") tillers, rear tine CRT ("counter rotating tine") tillers, and front tine tillers, also commonly referred to as cultivators. While each of these devices is capable of tilling the earth, each particular construction can be optimized for discrete operating conditions or operations.

Rotary tillers generally include a series of tines which are mounted on a single horizontal tiller shaft and rotated in order to provide a slicing action in which the tines cut through the soil. Many rotary tillers provide power and rotation to the tiller shaft through a worm drive. In worm drive systems, a motor drive shaft includes a worm portion that is configured to engage a worm gear extending around and coupled to the tiller shaft. In operation, rotation of the motor drive shaft is transferred to the tiller shaft through the interaction of the worm and the worm gear. Worm gear drives are popular because they allow for a significant reduction in rotational speed, while also allowing a higher torque to be transmitted to the tiller shaft.

Conventional, high-reduction worm drive rotary tillers are inefficient. In the past, efficiency of the worm drive gearbox was not a concern because rotary tillers are typically heavy pieces of gas powered equipment with a replenishable fuel source. However, if a compact, lightweight tiller is desired that operates on a limited power supply, such as a battery, the run time of the rotary tiller can be severely inhibited by the inefficiency of the gearbox.

Current rotary tillers that incorporate a worm drive reduction on the tine shaft leave an untilled strip in the center of the tilling path because the worm shaft that transmits power to the worm gear on the tine shaft cannot interfere with the tines as they rotate. Therefore, the depth of the cut made by the tines is limited by the existence of the uncut strip of soil coming into contact with the transmission housing. Rotary tillers that incorporate a chain drive reduction rather than a worm drive reduction on the tine shaft also leave an untilled strip in the center of the tilling path for similar reasons. Alternatively, chain drive reductions can be located on either end of the tine shaft. However, when this style of reduction is used, the tine hood and the chain reduction create obstacles that also limit the depth of the cut.

As discussed above, many tiller worm drives utilize large gear reductions with small diameter tine shafts to reduce rotational speed and increase torque. However, several problems relating to vegetation can occur with such a configuration. For example, vegetation commonly wraps around the small tine shaft very tightly because the small tine shaft has a large mechanical advantage. Additionally, the portion of the motor drive shaft that is exposed to the vegetation creates a location for the stationary surfaces of the rotary tiller to hold the vegetation while the rotating tines and tine shaft tightly wind the vegetation. This condition is generally compounded by the presence of bolts protruding from both the transmission and the tine shaft, as well as the presence of tines on either side of the transmission that grab the same vegetation and bend it around both sides of the transmission simultaneously. Additionally, when dealing with high reduction worm drives, the tine shaft is difficult to move by human power when the rotary tiller is powered down. In this case, the tines may need to be removed prior to unwinding the vegetation.

OVERVIEW

To better illustrate the rotary tiller disclosed herein, a non-limiting list of examples is provided here:

In Example 1, a rotary tiller can be provided that includes a frame, a cylindrical drum rotatable relative to the frame, a plurality of tines extending from the cylindrical drum, a motor at least partially disposed within the cylindrical drum, wherein the motor is configured to rotate a motor output member, and a transmission at least partially disposed within the cylindrical drum and configured to engage the motor output member. The transmission is operable to drive rotational movement of the cylindrical drum.

In Example 2, the rotary tiller of Example 1 is optionally configured to include a tine hood coupled to the frame and extending over at least a portion of the tines.

In Example 3, the rotary tiller of Example 2 is optionally configured such that the tine hood defines an inlet having a first width and a discharge having a second width, the second width being greater than the first width.

In Example 4, the rotary tiller of Example 3 is optionally configured such that the discharge includes a first stepped side tunnel adjacent to a first end of the cylindrical drum and a second stepped side tunnel adjacent to a second end of the cylindrical drum. The second stepped width can be greater than the first stepped width.

In Example 5, the rotary tiller of any one of or any combination of Examples 1-4 is optionally configured such that the motor is an electric motor.

In Example 6, the rotary tiller of Example 5 is optionally configured to include a battery for providing power to the motor.

In Example 7, the rotary tiller of any one of or any combination of Examples 1-4 is optionally configured to include a fuel tank coupled to the frame.

In Example 8, the rotary tiller of Example 7 is optionally configured such that the motor is a combustion engine.

In Example 9, the rotary tiller of any one of or any combination of Examples 1-8 is optionally configured such that the transmission is a planetary gearbox.

In Example 10, the rotary tiller of Example 9 is optionally configured such that the planetary gearbox includes an output shaft configured to engage with the cylindrical drum.

In Example 11, the rotary tiller of Example 10 is optionally configured such that the output shaft of the planetary gearbox includes a keyway configured to receive a key member extending from the cylindrical drum to transfer rotation of the output shaft to the cylindrical drum.

In Example 12, the rotary tiller of Example 11 is optionally configured such that the output shaft is received within a rotatable bearing coupled to a side shield of the rotary tiller.

In Example 13, the rotary tiller of any one of or any combination of Examples 1-12 is optionally configured to include a rotatable bearing extending around a circumference of the transmission and configured to engage a plate member extending from an inner surface of the cylindrical drum. The bearing could alternatively be located on the motor or an end cap of the motor.

In Example 14, a rotary tiller can be provided that includes a frame, a cylindrical drum rotatable relative to the frame, a plurality of tines extending from the cylindrical drum, an electric motor at least partially disposed within the cylindrical drum, wherein the electric motor is configured to rotate a motor output gear, a battery configured to provide power to the electric motor, and a planetary gearbox at least partially disposed within the cylindrical drum and including at least one set of planetary gears configured to engage the motor output gear. The planetary gearbox is operable to drive rotational movement of the cylindrical drum.

In Example 15, the rotary tiller of Example 14 is optionally configured such that the electric motor and the planetary gearbox are disposed within the cylindrical drum between a first side shield adjacent to a first end of the cylindrical drum and a second side shield adjacent to a second end of the cylindrical drum.

In Example 16, the rotary tiller of Example 15 is optionally configured such that the electric motor is coupled to the first side shield.

In Example 17, the rotary tiller of Example 16 is optionally configured such that the planetary gearbox includes an output shaft configured to engage with the cylindrical drum, wherein the output shaft is configured to be received within a rotatable bearing coupled to the second side shield.

In Example 18, the rotary tiller of any one of or any combination of Examples 14-17 is optionally configured to further include at least two wheels coupled to the frame at a location opposite of a user operating position, the rotary tiller being movable between a travel position wherein the at least two wheels are in contact with a ground surface and a tilling position wherein the tines are in contact with the ground surface and the at least two wheels are spaced apart from the ground surface and are positioned above a tine shield at least partially covering the tines.

In Example 19, the rotary tiller of any one of or any combination of Examples 14-18 is optionally configured to further include a handle assembly including at least one control device configured to communicate with an electronic motor controller.

In Example 20, a rotary tiller can be provided that includes a frame, a tine hood assembly coupled to the frame, wherein the tine hood assembly includes a first side shield, a second side shield, and a tine shield extending between the first and second side shields, a cylindrical drum disposed at least partially within the tine hood assembly, wherein the cylindrical drum includes a plurality of tines extending from an outer surface, a motor at least partially disposed within the cylindrical drum and coupled to the first side shield, wherein the motor is configured to rotate a motor output member, and a transmission at least partially disposed within the cylindrical drum and configured to engage the motor output member. The transmission includes a transmission output shaft configured to be received within a rotatable bearing coupled to the second side shield. Furthermore, the transmission output shaft is operable to drive rotational movement of the cylindrical drum.

In Example 21, the rotary tiller of any one of or any combination of Examples 1-20 is optionally configured such that all elements or options recited are available to use or select from.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2A is a front perspective view of the rotary tiller in the tilling position, in accordance with an example of the present disclosure.

FIG. 7 is an exploded perspective view of the planetary gearbox removed from the rotary tiller, in accordance with an example of the present disclosure.

DETAILED DESCRIPTION

The present patent application relates to rotary tiller systems and methods for tilling gardens, flowerbeds, lawns, and other ground surfaces.

Figure 1A:
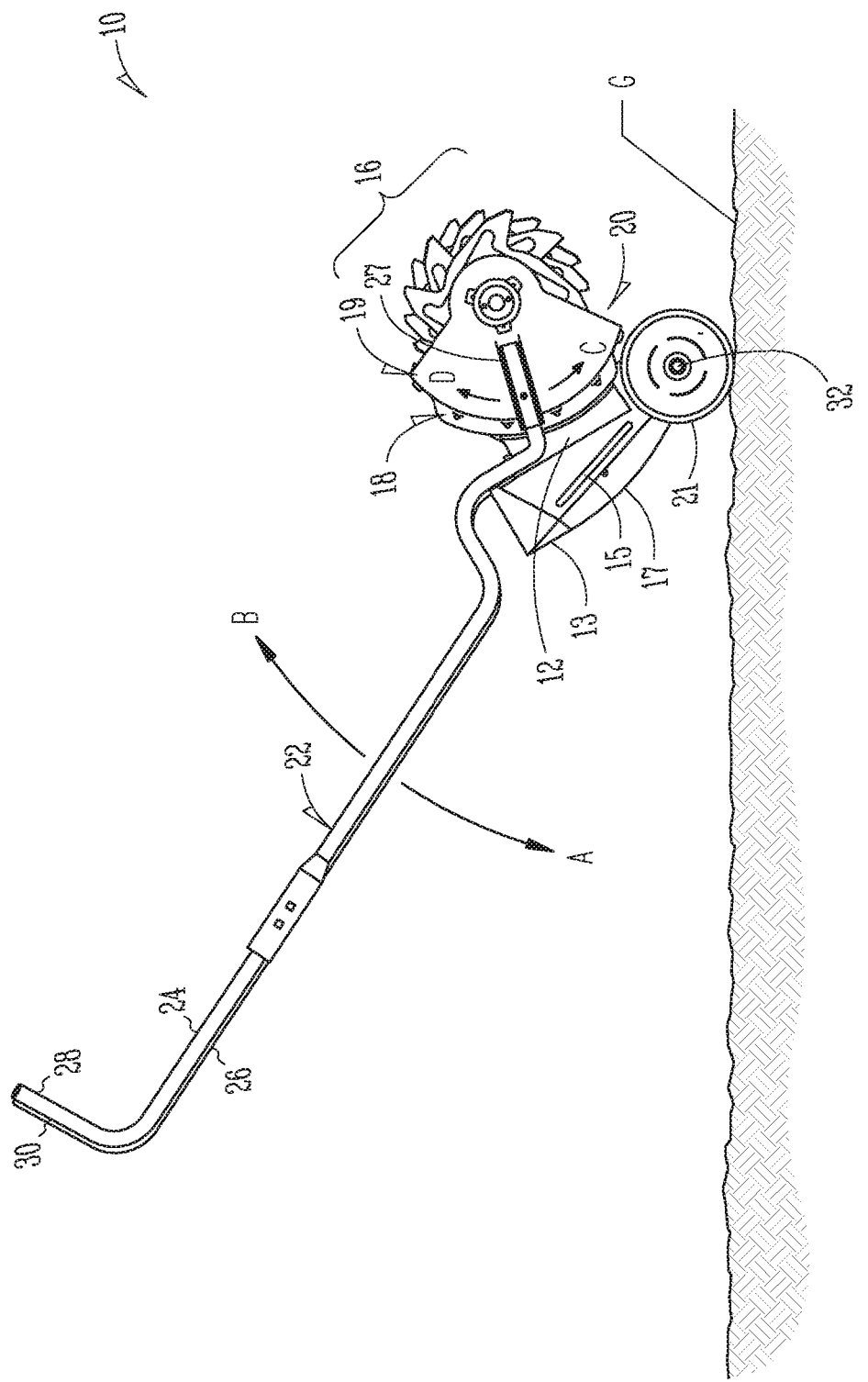
FIG. 1A is a side view of a rotary tiller in a travel position, in accordance with an example of the present disclosure.
Figure 1B:
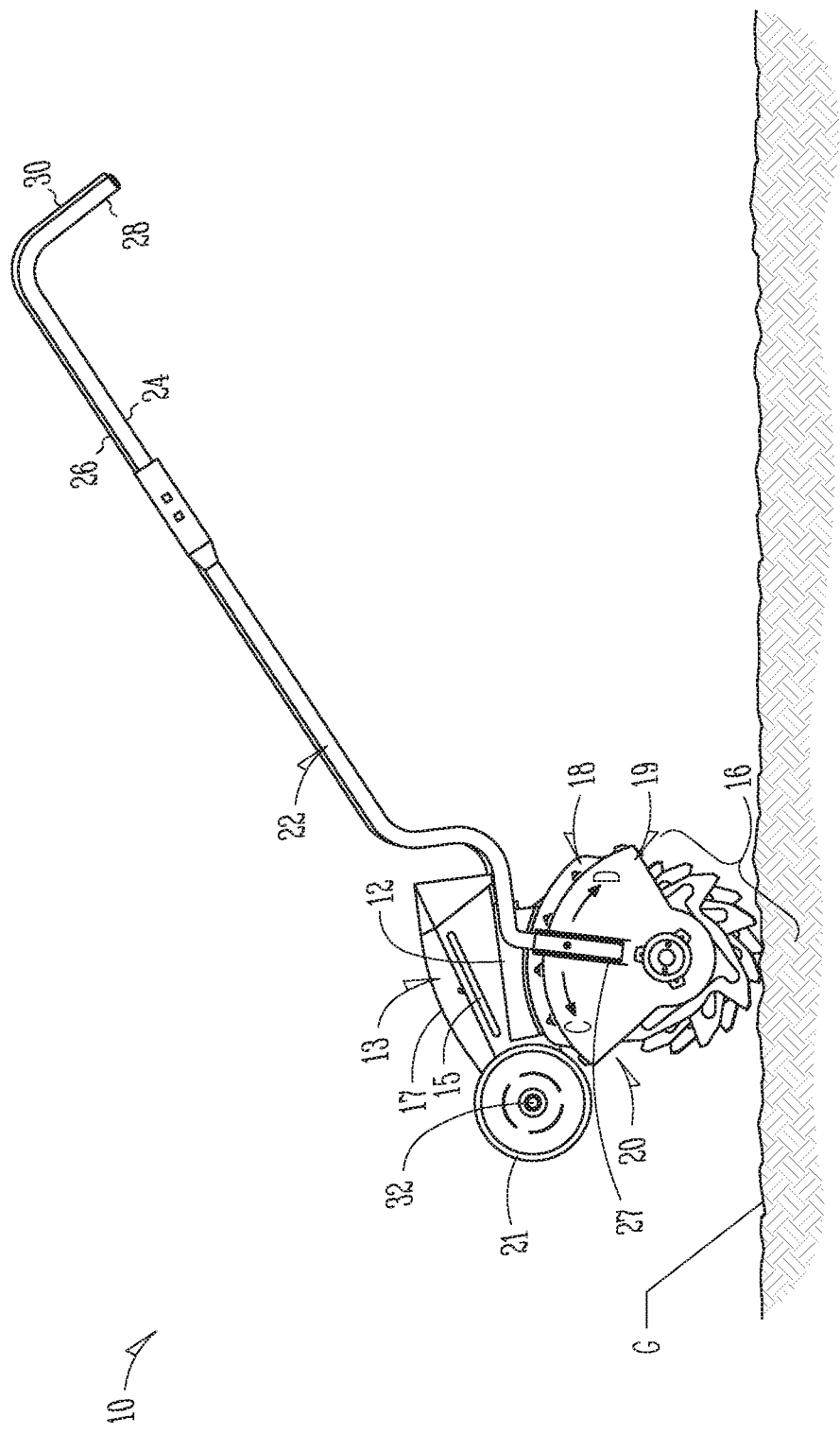
FIG. 1B is a side view of the rotary tiller in a tilling position, in accordance with an example of the present disclosure.

FIG. 1A is a side view of a rotary tiller 10 in accordance with an example of the present disclosure. As illustrated in FIG. 1A, the rotary tiller 10 can generally include a frame 12, a drive system 13 including a battery 15 (among other components, discussed in detail below), one or more tines 16 rotatably mounted on the frame 12 and configured to be driven by the drive system 13, and a cover 17 configured to at least partially cover one or more components of the rotary tiller 10 including the battery 15. The rotary tiller 10 can also include a tine hood assembly 18 coupled to the frame 12 and configured to surround at least a portion of the tines 16. The tine hood assembly 18 can define an inlet 19 and a discharge 20. Tilled soil, rocks, or the like can be received within the inlet 19 and redistributed to the ground through the discharge 19 during a tilling operation. One or more wheels 21 can be coupled to at least one of the frame 12 and the tine hood assembly 18 to allow a user to move the rotary tiller 10 between desired locations. Particularly, the position of the rotary tiller 10 can be adjustable between a travel position, as illustrated in FIG. 1A, in which the one or more wheels 21 can engage a ground surface G with the tines 16 spaced apart from the ground surface G, and a tilling position as illustrated in FIG. 1B, in which the tines 16 can engage the ground surface G and the one or more wheels 21 are spaced apart from the ground surface G. The two alternate positions allow a user to easily transport the rotary tiller 10 between tilling locations while maintaining a high level of tilling performance.

As illustrated in FIGS. 1A and 1B, the rotary tiller 10 can include a handle assembly 22 extending from the frame 12. In an example, the handle assembly 22 can include a first longitudinally extending shaft 24 and a second longitudinally extending shaft 26. As further illustrated in FIGS. 1A and 1B, the first and second longitudinally extending shafts 24 and 26 can have first and second angled grip portions 28 and 30, respectively, extending from upper ends thereof. In an example, the first and second angled grip portions 28 and 30 can be configured as "pistol-type grips," as will be discussed in further detail below with reference to FIG. 1C.

The frame 12 of the rotary tiller 10 can be pivotably coupled to an axle 32 extending between the wheels 21. The axle 32 can be fixedly coupled to the wheels 21 to allow simultaneous rotation of both wheels 21 during transport of the rotary tiller 10. The pivotable coupling allows, among other components, the frame 12, the tines 16, the tine hood assembly 18, and the handle assembly 22 to be rotated with respect to the wheels 21 and the axle 32. Thus, when the rotary tiller 10 is in the travel position of FIG. 1A, the user can rotate the handle assembly 22 in a direction A to lower the handle assembly 22 toward the ground surface G, which in turn raises the tines 16 further away from the ground surface G in order to, for example, avoid obstacles that might interfere with the tines 16. Conversely, the user can rotate the handle assembly 22 in a direction B to raise the handle assembly 22 away from the ground surface G, which in turn lowers the tines 16 toward the ground surface G. Thus, by moving the handle assembly 22 in the directions A and B, users of different heights can find an appropriate and comfortable position for the handle assembly 22 relative to the ground surface G. In order to adjust the rotary tiller 10 from the travel position of FIG. 1A to the tilling position of FIG. 1B, the user can continue to rotate the handle assembly 22, by at least one of a pushing action or a pulling action, until the tines 16 are engaged with the ground surface G as illustrated in FIG. 1B. In the tilling position, the rotary tiller 10 can be operated such that the drive system 13 rotates the tines 16, causing the ground surface G to be pulverized and cultivated, for example, in preparation for planting flowers, crops, or the like in soil.

In an alternative example, a separate axle 32 can be provided for each of the wheels 21. In yet another alternative example, the axle 32 can be fixedly coupled to the frame 12 with the wheels 21 being rotatably coupled to the axle 32, such as with one or more roller bearings. In this example, when the handle assembly 22 is rotated in directions A and B, the wheels 21 act as the pivot points about which the remaining components of the rotary tiller 10 rotate. Regardless of the configuration of the axle 32 and the wheels 21, the frame 12 can remain pivotable with respect to the wheels 21 when the rotary tiller 10 is in the travel position of FIG. 1A with the wheels 21 on the ground surface G.

As further illustrated in FIGS. 1A and 1B, the first and second longitudinally extending shafts 24 and 26 of the handle assembly 22 can be coupled to the frame 12 or side shields of the rotary tiller 10 with handle brackets 27 (only the handle bracket 27 associated with the first longitudinally extending shaft 24 being shown in FIGS. 1A and 1B). In an example, the handle brackets 27 can be adjustable in directions C and D such that the position of the handle assembly 22 can be further adjusted according to the preferences of the user.

Figure 1C:
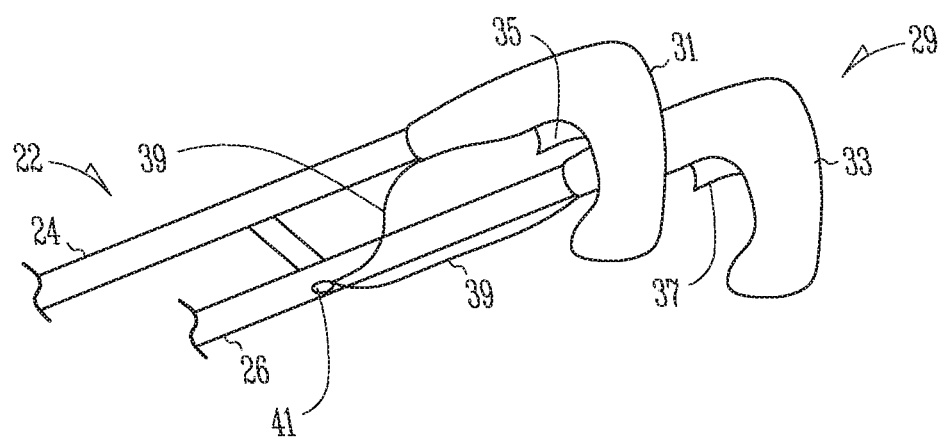
FIG. 1C is a perspective view of a control system that can be provided on a handle assembly of the rotary tiller, in accordance with an example of the present disclosure.

FIG. 1C is a perspective view of a control system 29 that can be provided on the handle assembly 22 for controlling operation of the drive system 13, in accordance with an example of the present disclosure. As illustrated in FIG. 1C, the first and second angled grip portions 28 and 30 can include first and second control handles 31 and 33, respectively. The first control handle 31 can include a first actuation mechanism, such as a first trigger 35. Similarly, the second control handle 33 can include a second actuation mechanism, such as a second trigger 37. The first and second control handles 31 and 33 can be communicatively coupled to the drive system 13 with a pair of control cables 39. The control cables 39 can be routed through an aperture 41 located in one of the first and second longitudinally extending shafts 24 and 26 of the handle assembly 22 to avoid interference with the user during transport or operation.

With further reference to FIG. 1C, one of the triggers 35, 37 can be configured as a safety mechanism while the other one of the triggers 35, 37 can be configured to control operation of the drive system 13. In an example, the user must first actuate one of the triggers 35, 37 to disengage a safety lockout feature. Once the safety lockout feature is disengaged, the user can actuate the other one of the triggers 35, 37 to initiate operation of the rotary tiller 10. Thus, in this example, the user cannot accidentally initiate operation of the rotary tiller 10 by actuating only one of the triggers 35, 37. However, alternative examples of the control system 29 can include only a single trigger or actuation mechanism to initiate operation of the rotary tiller 10.

Figure 2B:
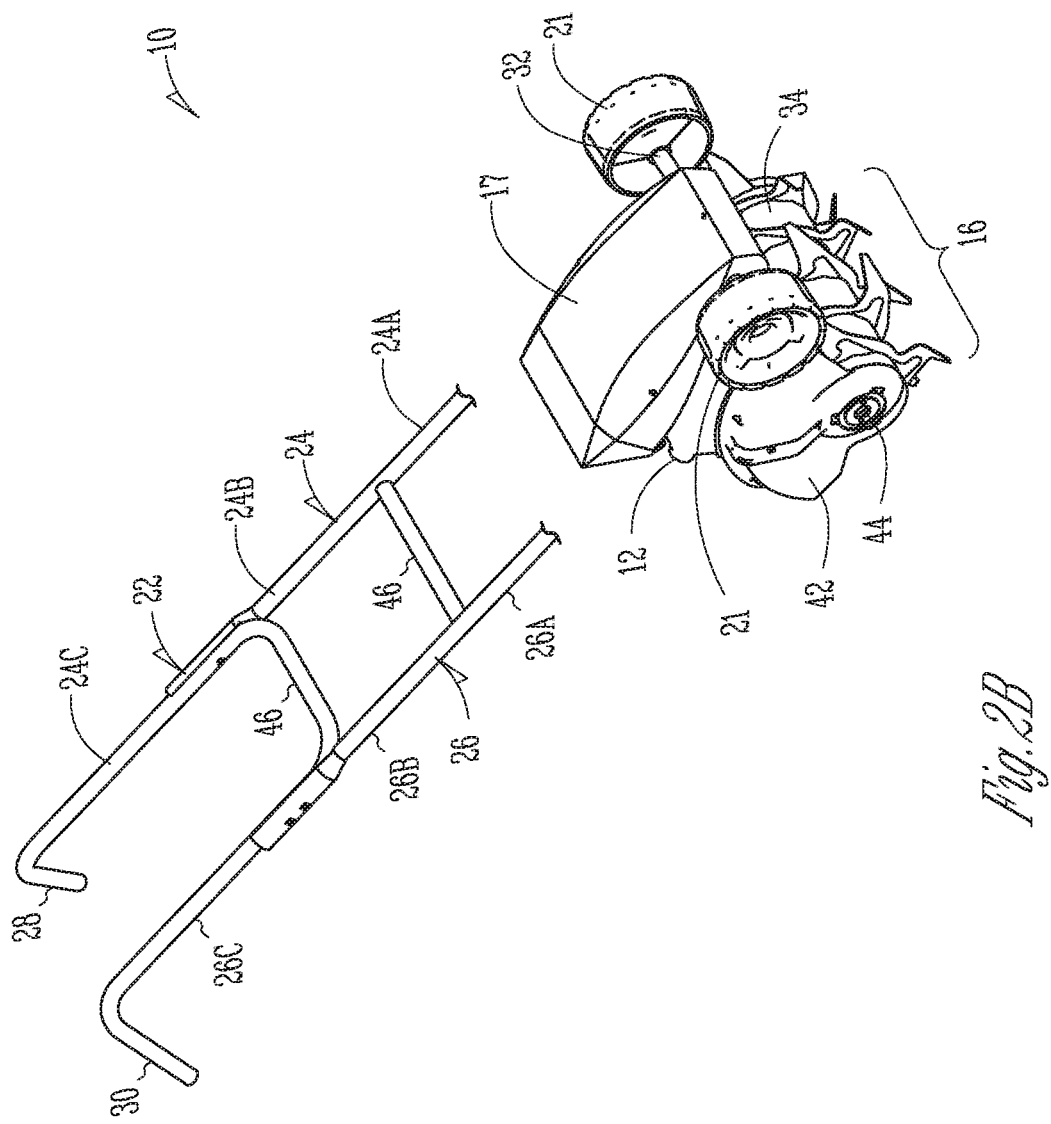
FIG. 2B is an alternative front perspective view of the rotary tiller in the tilling position, in accordance with an example of the present disclosure.

FIGS. 2A and 2B are alternative front perspective views of the rotary tiller 10 in the tilling position with the wheels 21 raised above the tines 16. As illustrated in FIGS. 2A and 2B, the tines 16 can be coupled to or formed integral with a drum 34. The drum 34 can be, but is not necessarily, cylindrical in shape. The drum 34 can be configured to extend substantially between a first side shield 40 and a second side shield 42 of the tine hood assembly 18. The second side shield 42 can include a bearing plate 44 configured to receive an output shaft of the drive system 13 for driving rotation of the drum 34 and tines 16 relative to the tine hood assembly 18, as discussed in further detail below.

As further illustrated in FIGS. 2A and 2B, the handle assembly 22 can include one or more crossbar support members 46 extending between the first longitudinally extending shaft 24 and the second longitudinally extending shaft 26. Although two such crossbar support members 46 are shown in FIGS. 2A and 2B, any number of crossbar support members 46 is possible. Furthermore, the crossbar support members 46 are shown as extending in a direction generally perpendicular to the directions of the first and second longitudinally extending shafts 24 and 26 merely for purposes of example and not limitation. However, the crossbar support members 46 can intersect the first and second longitudinally extending shafts 24 and 26 at any desired angle. In an example, a pair of crossbar support members 46 can be positioned such that they overlap each other in the space formed between the first and second longitudinally extending shafts 24 and 26, thereby creating a substantially "X-shaped" configuration.

The first longitudinally extending shaft 24 of the handle assembly 22 can comprise a plurality of shaft sections, such as shaft sections 24A-C. Similarly, the second longitudinally extending shaft 26 of the handle assembly 22 can comprise a plurality of shaft sections, such as shaft sections 26A-C. In an example, the shaft sections 24A-C and the shaft sections 26A-C can be telescopically coupled such that the handle assembly 22 can be retracted, which can allow for easier transport and storage. In another example, the shaft sections 24A-C and the shaft sections 26A-C can be hinged such that the handle assembly 22 can be collapsed.

Figure 3:
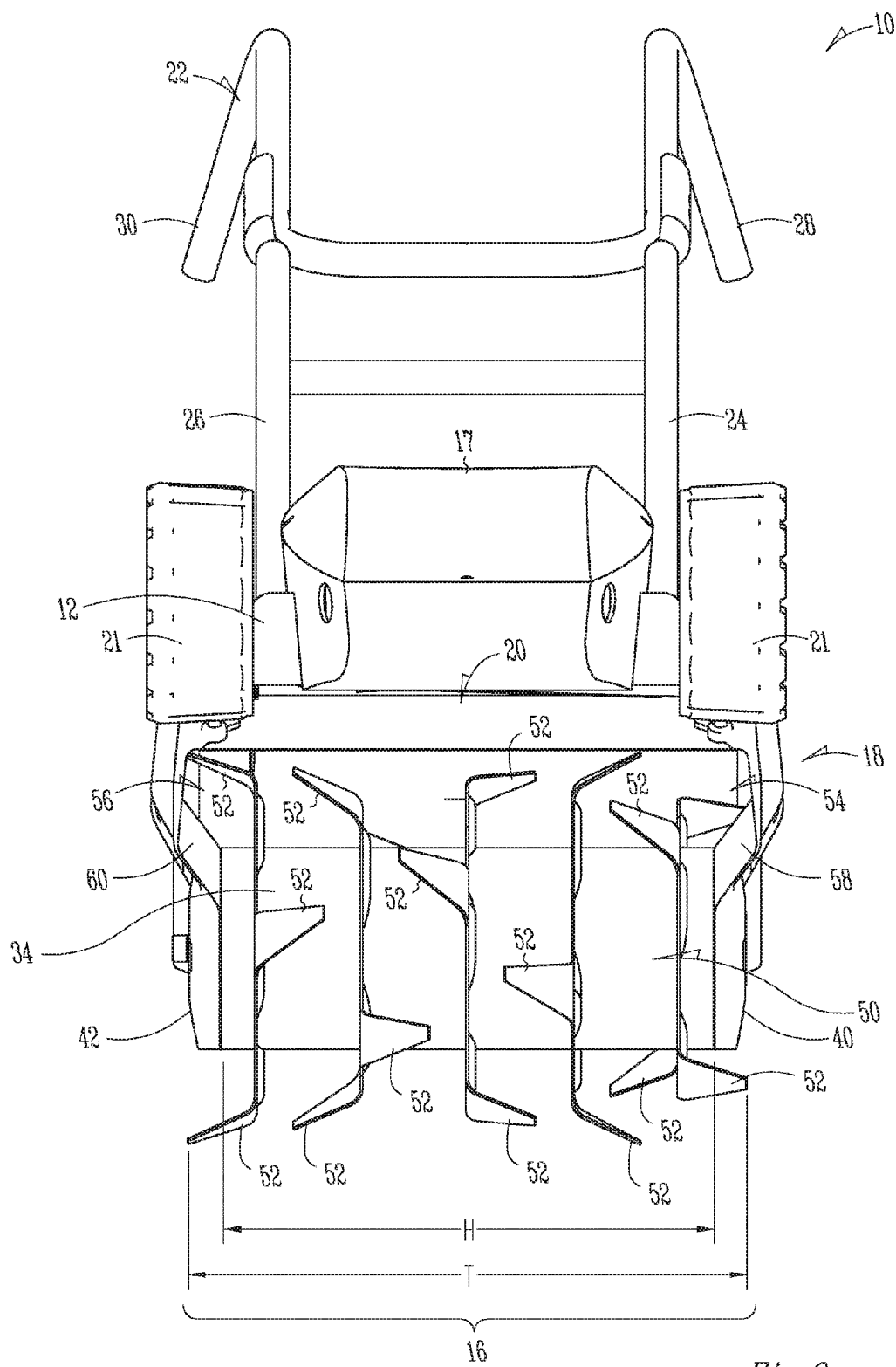
FIG. 3 is a front view of the rotary tiller in the tilling position, in accordance with an example of the present disclosure.

FIG. 3 is a front view of the rotary tiller 10 in the tilling position. As illustrated in FIG. 3, the tine hood assembly 18 can include an opening 50 that is sized and configured to receive and allow rotation of the drum 34 and the tines 16 extending therefrom. Each of the tines 16 can include a plurality of blades 52 configured for cutting through and cultivating the ground. The tines 16 can be configured such that at least two or more of the blades 52 of a particular tine 16 extend in generally opposing directions. In an example, the blades 52 of a particular tine 16 can form an alternating configuration where all even numbered blades 52 extend in a first direction toward the rotary tiller 10 and all odd numbered blades 52 extend in a second direction away from the rotary tiller 10, as generally depicted in FIG. 3. The inverted configuration of the tines 16 can keep material from accumulating on the blades 52. The outwardly facing blades 52 can be configured to perform a large percentage of the cutting. The tines 16 can work together to dig into the ground aggressively, while moving the material away from the tines 16 to avoid clogging of the rotary tiller 10.

In operation, the tines 16 extending from the drum 34 can be configured for forward rotation and/or backward rotation. As the tines 16 are rotating in the direction selected by the user, the user can steer the rotary tiller 10 by holding onto the first and second grip portions 28 and 30 of the handle assembly 22. Thus, the forward or backward propulsion of the rotary tiller 10 can be provided by the tines 16 digging into the ground and pulling the rotary tiller 10 forward or pushing the rotary tiller 10 backward. In addition to rotating the tines 16 (via the drum 34), the drive system 13 can also be configured to rotate the wheels 21 in self-propelled rotary tiller examples.

The rotary tiller 10 shown and described herein includes five tines 16 merely for purposes of example and not limitation. Rotary tillers having any number of tines 16 greater than or equal to two are contemplated and within the intended scope of the present disclosure. Furthermore, the size of the tines 16 and the configuration of the blades 52, including the number of blades 52 provided on the tines 16, need not be uniform.

As further illustrated in FIG. 3, the tine 16 adjacent to the first side shield 40 of the tine hood assembly 18 can be sized and configured such that at least one of the blades 52 extends outside of the tine hood assembly 18 past the first side shield 40. Similarly, the tine 16 adjacent to the second side shield 42 of the tine hood assembly 18 can be sized and configured such that at least one of the blades 52 extends outside of the tine hood assembly 18 past the second side shield 42. Providing a tine cutting width T that is greater than a width H of a bottom side of the tine hood assembly 18 can help prevent the rotary tiller 10 from becoming hung up on untilled ground adjacent to the rotary tiller 10.

The discharge 20 of the tine hood assembly 18 can also include a first stepped side tunnel 54 and a second stepped side tunnel 56. The first stepped side tunnel 54 and the second stepped side tunnel 56 can define an enlarged opening at the discharge 20 of the tine hood assembly 18 as compared to the inlet 19. During a tilling operation, ground material such as soil, rocks and other debris can get caught up within the tine hood assembly 18, which can clog or otherwise impede the passage of the ground material through the rotary tiller 10. In an example, the first stepped side tunnel 54 and the second stepped side tunnel 56 can be defined, at least in part, by the first side shield 40 and the second side shield 42, respectively. The first and second stepped side tunnels 54 and 56 can have any suitable shape that allows for improved passage of ground material. In an example, the first stepped side tunnel 54 can include a first angled tunnel surface 58 and the second stepped side tunnel 56 can include a second angled tunnel surface 60. The first and second angled tunnel surfaces 58 and 60 can be configured to assist with the passage of ground material by redirecting the ground material out through the discharge 20.

Figure 4:
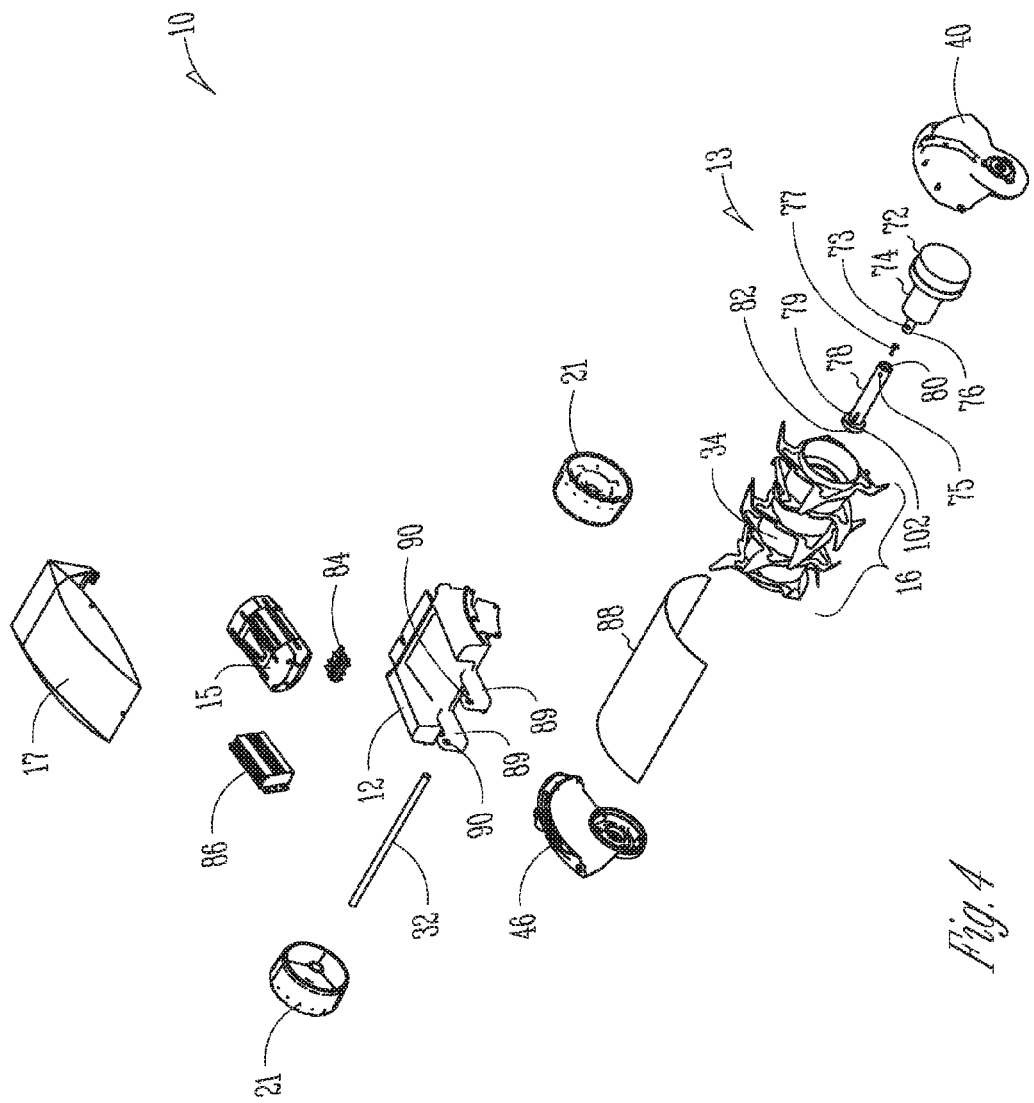
FIG. 4 is an exploded perspective view of a portion of the rotary tiller, in accordance with an example of the present disclosure.

FIG. 4 is an exploded perspective view of the rotary tiller 10 with the handle assembly 22 removed. As illustrated in FIG. 4, the drive system 13 can further include an electric motor 72, a transmission such as a planetary gearbox 74 having a gearbox output shaft 76, and an extension shaft 78 configured to be coupled to the gearbox output shaft 76 on a first end 80 and to the drum 34 on a second end 82. Particularly, the gearbox output shaft 76 can be sized such that it can be received within an internal portion of the extension shaft 78. The gearbox output shaft 76 can include a channel 73 that can be configured to align with a pair of apertures 75 adjacent to the first end 80 of the extension shaft 78. When properly aligned, a suitable fastening means such as a bolt 77 can be inserted through the apertures 75 and the channel 73 to secure the gearbox output shaft 76 to the extension shaft 78. In an example, one or more of the channel 73 and the apertures 75 can be internally threaded so as to engage a threaded external portion of the bolt 77. In a further example, the bolt 77 can be inserted through the apertures 75 and the channel 73, and subsequently secured in place with a nut or other complementary fastening member. Rather than being formed as a separate component, in various examples, the extension shaft 78 can form a part of the gearbox output shaft 76. The extension shaft 78 can be coupled to the drum 34 in any suitable manner. In an example, the drum 34 can include a key member that can be configured for receipt within a keyway 79 defined in the extension shaft 78 near the second end 82.

The structure and operation of the planetary gearbox 74 will be described in further detail below with reference to FIGS. 6 and 7. However, in general, planetary gearboxes can include one or more outer gears, or planet gears, that mesh with and revolve around a central, or sun gear. Typically, the axes of the gears are parallel to one another. In various examples, several sets of planet gears and sun gears can be "stacked" in series in order to produce a desired output of the planetary gearbox. Planetary gearboxes can be advantageous over other types of transmission systems due to their compactness, low efficiency loss, and increased torque distribution.

The battery 15 can be operably coupled to the electric motor 72 through a battery connector 84 and one or more cables (not shown). In an example, the battery 15 can be a lithium battery, such as a 20 Volt lithium battery. Other types of batteries that can be used include, but are not limited to, Ni-cad batteries and lead acid batteries. Furthermore, the battery can provide any suitable voltage, such as between about 12 Volts and about 48 Volts. The drive system 13 can also include an electronic motor controller 86 for controlling the electric motor 72. In various examples, the motor controller 86 can include a manual or automatic means for starting and stopping the electric motor 72, selecting forward or reverse rotation of the drum 34, selecting and regulating the speed, regulating or limiting the torque, and protecting against overloads and/or faults. Furthermore, the motor controller 86 can include control circuitry in the form of analog or digital input signals.

As further illustrated in FIG. 4, the tine hood assembly 18 can further include a tine shield 88 configured to extend between the first side shield 40 and the second side shield 42. In an example, the tine shield 88 can be formed as a curved planar surface that defines at least a portion of the inlet 19 and the discharge 20 of the tine hood assembly 18. The tine shield 88 can be secured to the first side shield 40 and the second side shield 42 using any suitable fastening means including, but not limited to, bolts, screws, rivets, welding, or the like. Alternatively, the tine shield 88 can be formed integral with the first side shield 40 and/or the second side shield 42.

As discussed above, the frame 12 of the rotary tiller 10 can be rotatably coupled to the wheels 21. As illustrated in FIG. 4, the frame 12 can include one or more wheel mounts 89 extending therefrom. In an example, each of the one or more wheel mounts 89 can include an aperture 90 configure to allow passage of the axle 32. The wheels 21 can be fixedly coupled to the ends of the axle 32, and the one or more apertures 90 can be sized such that they can retain the axle 32 while allowing the axle 32 and the wheels 21 to rotate. In this example, each of the one or more apertures 90 can include a rotatable bearing to allow rotation of the axle 32 relative to the corresponding wheel mount 89. In another example, the axle 32 can be fixedly coupled within the one or more apertures 90, and the wheels 21 can be rotatably coupled to the ends of the axle such that the wheels 21 rotate while the axle 32 remains stationary. In this example, each of the wheels 21 can be coupled to an end of the axle 32 by a rotatable bearing.

The example of the rotary tiller 10 has been described as including a drive system 13 having an electric motor 72, a battery 15, a battery connector 84, and an electronic motor controller 86 merely for purposes of example and not limitation. In an example, the electric motor 72 can receive power from a power cord coupled to the rotary tiller 10 and extending to a power outlet. In various alternative examples, other types of power sources and engines can be used, such as gasoline, diesel, petroleum, or propane powered combustion engines. In these examples, the battery 15 can be replaced with a suitable fuel tank.

Figure 5:
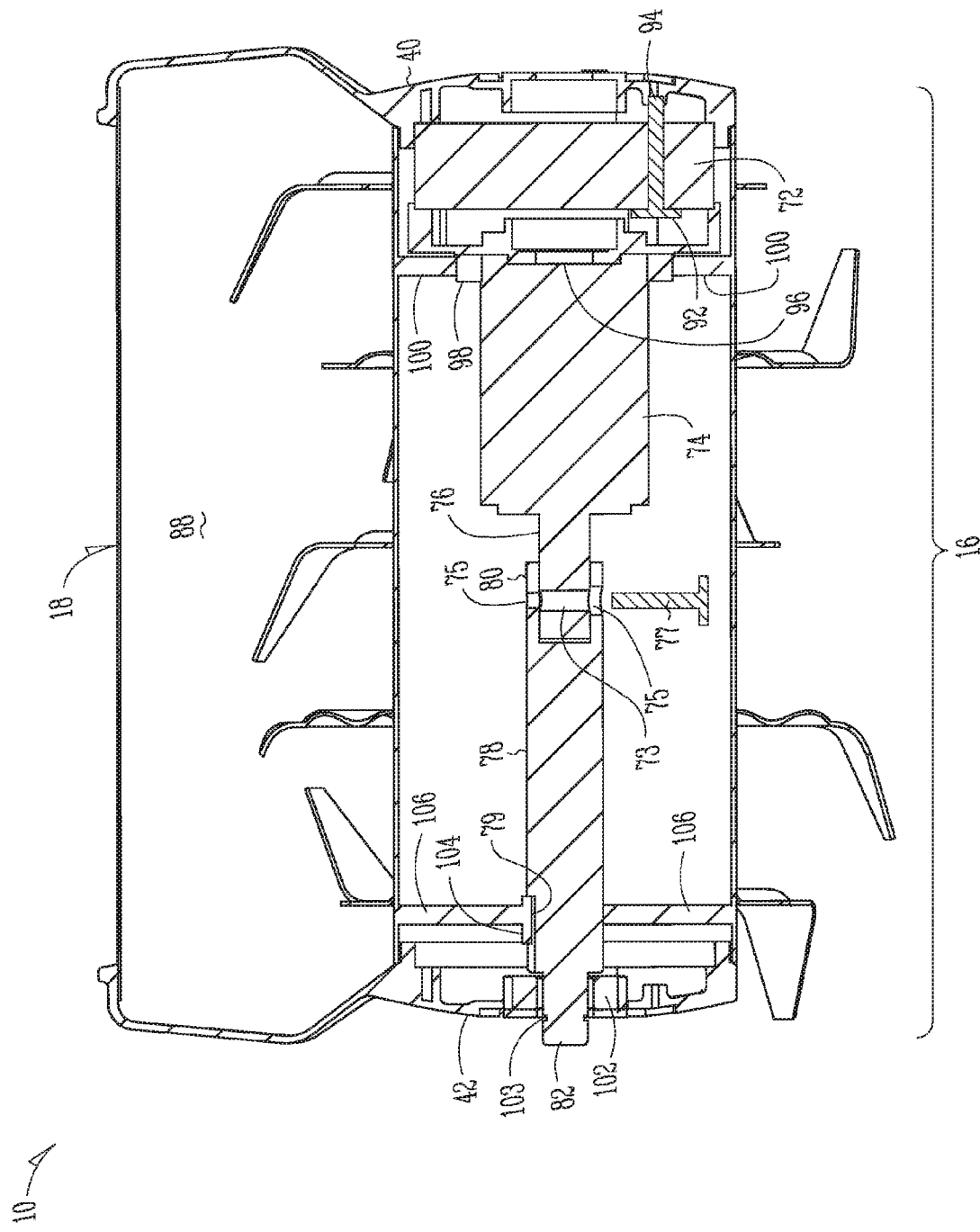
FIG. 5 is a front cross-sectional view of the rotary tiller, in accordance with an example of the present disclosure.

FIG. 5 is a cross-sectional view of a portion of the rotary tiller 10 from a front side of the tine hood assembly 18. As illustrated in FIG. 5, the electric motor 72, the planetary gearbox 74, the gearbox output shaft 76, and the extension shaft 78 can all be operatively assembled within an interior portion of the drum 34. Consequently, the drive and transmission portions of the rotary tiller 10 can be isolated from the exterior of the rotary tiller 10 such that they do not interfere with the tilling operation or impose limitations on the cutting and tilling actions of the tines 16. This positioning of the drive and transmission components can result in a greater tilling width, avoidance of an untilled strip in the center of the tilling path, and a reduction in the amount of vegetation that might otherwise be wound around the drive and transmission portions of the rotary tiller.

With reference to FIG. 5, the electric motor 72 can be coupled to the first side shield 40 with one or more fastening members, such as a threaded bolt 92, extending between opposing sides of the electric motor 72 and configured to engage a threaded receptacle 94 on an interior surface of the first side shield 40. Although the cross-section of FIG. 5 depicts a single bolt 92, at least one additional bolt 92 can be provided. In an example, three such bolts 92 can be utilized. An output shaft or gear 96 of the electric motor 72 can extend in an axial direction into the planetary gearbox 74. A gearbox bearing 98, extending around a circumference of the planetary gearbox 74, can be retained by a bearing retainer plate 100 extending from an inner surface of the drum 34. In an example, the bearing retainer plate 100 can be welded to the drum 34. The gearbox bearing 98 can be configured to allow for rotation of the drum 34 around the stationary planetary gearbox 74 and electric motor 72 with minimal friction.

As further illustrated in FIG. 5, the second end 82 of the extension shaft 78 can be inserted through a shaft bearing 102 secured to the second side shield 42, such as by a press-fit coupling. Once inserted into the shaft bearing 102, axial movement of the extension shaft 78 toward the interior of the hub 34 can be prevented by coupling a snap ring (not shown) into a snap ring groove 103 formed in the second end 82 of the extension shaft 78. The shaft bearing 102 can be configured to allow for rotation of the extension shaft when driven by the electric motor 72 and planetary gearbox 74. Interconnection of the extension shaft 78 with the drum 74 can be accomplished with, for example, a key member 104 positioned within the keyway 79 defined in the extension shaft 78 near the second end 82. Particularly, the key member 104 can be located on a plate 106 extending from the inner surface of the drum 34. In an example, the plate 106 can be welded to the drum 34. When the key member 104 is positioned within the keyway 79, rotation of the extension shaft 78 can be transferred to the drum 34, thus causing rotation of the tines 16 for performing a tilling operation.

Figure 6:
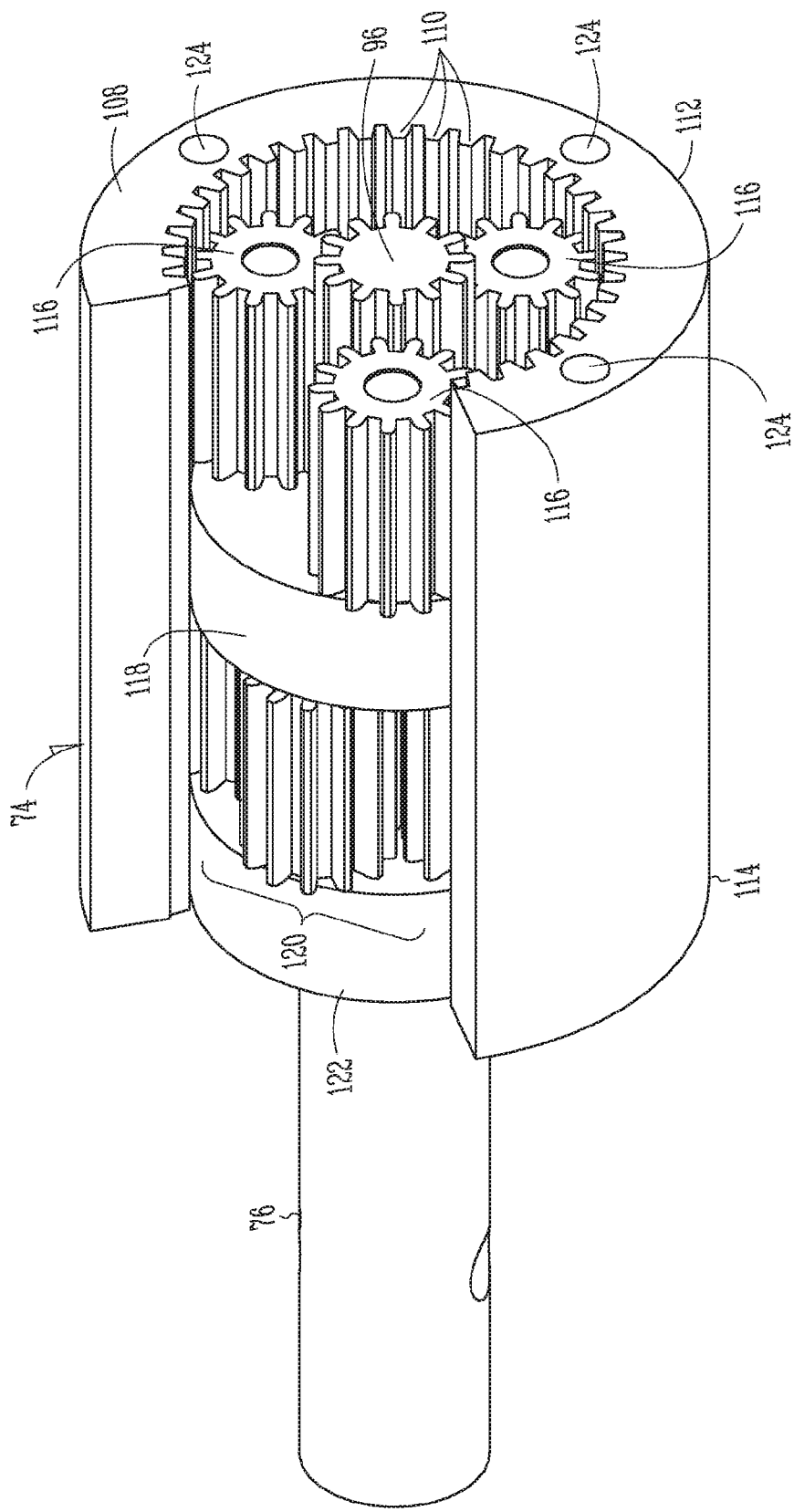
FIG. 6 is a perspective view of a planetary gearbox removed from the rotary tiller, in accordance with an example of the present disclosure.

FIG. 6 is a perspective view of the planetary gearbox 74 removed from the rotary tiller 10, in accordance with an example of the present disclosure. As illustrated in FIG. 6, the planetary gearbox 74 can include a housing 108 having a series of inwardly-facing teeth 110 extending between a first end 112 and a second end 114. In FIG. 6, a portion of the housing 108 has been cut away to better illustrate the internal components of the planetary gearbox 74. The planetary gearbox 74 can further include a first set of planetary gears 116 coupled to a first rotatable disk 118 and configured to mesh with the output gear 96 of the electric motor 72, and a second set of planetary gears 120 coupled to a second rotatable disk 122. One or more mounting features, such as mounting apertures 124 configured to receive fastening members, can be located around the periphery of the first end 112 of the housing 108 to allow for mounting of the planetary gearbox 74 within the hub 34.

FIG. 7 is an exploded perspective view of the planetary gearbox 74 removed from the rotary tiller 10, in accordance with an example of the present disclosure. As illustrated in FIG. 7, each of the gears in the first set of planetary gears 116 includes a channel 126 configured to receive and engage a post 128 extending from the first rotatable disk 118. An opposing side of the first rotatable disk 118 includes an intermediate drive gear 129 fixed thereto and configured to mesh with the second set of planetary gears 120. Each of the gears in the second set of planetary gears 120 includes a channel 130 configured to receive and engage a post 132 extending from the second rotatable disk 122. An opposing side of the second rotatable disk 122 includes the gearbox output shaft 76 fixed thereto.

In an example, the output gear 96 can rotate in direction D1 and mesh with the first set of planetary gears 116, which causes the first set of planetary gears 116 to rotate in an opposite direction D2. Due to the meshing engagement between the teeth of the first set of planetary gears 116 and the inwardly-facing teeth 110 of the stationary housing 108, together with the rotatable coupling between the posts 128 of the first rotatable disk 118 and the channels 126, the first rotatable disk 118 is driven in direction D1. Because the intermediate drive gear 129 is fixedly coupled to the first rotatable disk 118, the intermediate drive gear 129 is also driven in direction D1. Subsequently, the meshing engagement between the intermediate drive gear 129 and the second set of planetary gears 120 causes the second set of planetary gears 120 to rotate in direction D2. Furthermore, due to the meshing engagement between the teeth of the second set of planetary gears 120 and the inwardly-facing teeth 110 of the stationary housing 108, together with the rotatable coupling between the posts 132 of the second rotatable disk 122 and the channels 130, the second rotatable disk 122, along with the gearbox output shaft 76, is driven in direction D1.

The foregoing description of the planetary gearbox operation can allow for a significant reduction in rotational speed, while also allowing a higher torque to be transmitted to the gearbox output shaft 76. In an example, the gear reduction between the output gear 96 and the intermediate drive gear 129 can be between about 2:1 and about 40:1. In an example, the gear reduction between the intermediate drive gear 129 and the gearbox output shaft 76 can also be between about 2:1 and about 40:1. The requisite gear ratio can be dependent on the speed of the input motor and the desired tine speed during a tilling operation. In an example, the desired tine speed can be about 200 revolutions per minute (RPM).

FIGS. 6 and 7 illustrate only one example of a planetary gearbox 74 in accordance with the present disclosure. Thus, the planetary gearbox 74 can include other configurations of gears, numbers of gears, and sizes of gears that produce different gear reduction ratios without departing from the intended scope of the present disclosure. For example, although a two-stage planetary gear system is shown, planetary gear systems having more than two stages, or a single stage, can be utilized. Furthermore, the output gear 96 is described as being rotated in direction D1 merely for purposes of example and not limitation. Thus, in other examples, the output gear 96 can be rotated in direction D2.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A rotary tiller comprising:
   a frame;
   a cylindrical drum rotatable relative to the frame;
   a plurality of tines extending from the cylindrical drum;
   a motor at least partially disposed within the cylindrical drum, the motor configured to rotate a motor output member;
   a transmission at least partially disposed within the cylindrical drum and configured to engage the motor output member, the transmission operable to drive rotational movement of the cylindrical drum; and
   a tine hood coupled to the frame and extending over at least a portion of the tines, the tine hood including a first side shield, a second side shield, and a tine shield extending between the first and second side shields, wherein an inlet of the tine hood is formed between the first and second side shields, the inlet defining an inlet width, wherein the inlet width of the tine hood is greater than a width between the first and second side shields at an axis of rotation of the cylindrical drum.

2. The rotary tiller of claim 1, wherein the motor is an electric motor.

3. The rotary tiller of claim 2, further comprising a battery configured to provide power to the motor.

4. The rotary tiller of claim 1, further comprising a fuel tank coupled to the frame.

5. The rotary tiller of claim 4, wherein the motor is a combustion engine.

6. The rotary tiller of claim 1, wherein the transmission is a planetary gearbox.

7. The rotary tiller of claim 6, wherein the planetary gearbox includes an output shaft configured to engage with the cylindrical drum.

8. The rotary tiller of claim 7, wherein the output shaft of the planetary gearbox includes a keyway configured to receive a key member extending from the cylindrical drum to transfer rotation of the output shaft to the cylindrical drum.

9. The rotary tiller of claim 8, wherein the output shaft is configured to be received within a rotatable bearing coupled to a side shield of the rotary tiller.

10. The rotary tiller of claim 1, further comprising a rotatable bearing extending around a circumference of the transmission and configured to engage a plate member extending from an inner surface of the cylindrical drum.

* * * * *